US008209092B2

(12) United States Patent
Wiener

(10) Patent No.: US 8,209,092 B2
(45) Date of Patent: Jun. 26, 2012

(54) SYSTEM AND METHOD FOR SENSING LOADS

(76) Inventor: Patricia Wiener, La Honda, CA (US)

( * ) Notice: Subject to any disclaimer, the term of this patent is extended or adjusted under 35 U.S.C. 154(b) by 965 days.

(21) Appl. No.: 11/726,767

(22) Filed: Mar. 23, 2007

(65) Prior Publication Data
US 2008/0234898 A1 Sep. 25, 2008

(51) Int. Cl.
G05D 3/00 (2006.01)
(52) U.S. Cl. ......................................................... 701/45
(58) Field of Classification Search .................... 701/45; 340/665–668; 180/271, 273
See application file for complete search history.

(56) References Cited

U.S. PATENT DOCUMENTS

| | | | |
|---|---|---|---|
| 5,256,468 A | 10/1993 | Wiener | |
| 6,353,394 B1 * | 3/2002 | Maeda et al. | 340/667 |
| 6,712,387 B1 | 3/2004 | Breed et al. | |
| 7,043,997 B2 | 5/2006 | Mattson et al. | |
| 7,110,626 B2 | 9/2006 | Tsai | |
| 2002/0198645 A1 * | 12/2002 | Ishida et al. | 701/45 |
| 2004/0247228 A1 * | 12/2004 | Murad et al. | 385/12 |
| 2009/0106905 A1 * | 4/2009 | Ochi et al. | 5/713 |

* cited by examiner

Primary Examiner — Kim T Nguyen
(74) Attorney, Agent, or Firm — Gard & Kaslow LLP

(57) ABSTRACT

An optical sensing system detects pressure through attenuation of light in an optical fiber. The weight and position of a load on a mat including multiple optical fibers may be determined; for example, such a mat may be used in an automobile seat to determine theses parameters for a passenger in the seat. This information can be presented to an airbag deployment system to easily enable the airbag to be deployed or suppressed in a manner sensitive to the weight and position of the occupant. This methodology allows loads, load movement, and load position to be detected in vehicles. In applications for vehicles such as aircraft or boats, sensing weight, position and movement of cargo can warn an operator or pilot in sufficient time to correct dangerous shifts in weight within the cargo portion of the vehicle or to modify the operation of the vehicle to compensate for such shifts.

28 Claims, 10 Drawing Sheets

SYSTEM AND METHOD FOR SENSING LOADS

BACKGROUND

1. Field of the Invention

The present invention relates to sensing loads, and more specifically to sensing loads through use of an optical fiber positioned so that weight pressing on the fiber will cause attenuation in light passing through the fiber.

2. Description of the Related Art

There are many applications in which it is useful to be able to sense loads automatically, and in particular to sense the position and weight of the load. One particular area in which such capability is desirable is in determining the weight and position of a passenger in an automobile seat in order to determine the most appropriate deployment of an airbag in the event of an accident and, for example, to suppress such deployment in certain cases such as where the passenger is a small child. The requirement of next generation airbag suppression systems on all vehicles is being mandated for full implementation for all cars in the year 2008. This poses a technical challenge for which there are some proposed solutions. However, none of these solutions are simple enough to be readily manufactured and distributed.

The general task of ascertaining the weight and, to some extent the position, of a passenger in an automobile seat in connection with airbag deployment has been explored in the prior art. See, for example, Breed et al., U.S. Pat. No. 6,712,387. Breed describes a system and method for determining the presence of an occupant and/or the position of the occupant as well as various devices to control and influence the deployment of a side airbag. The system described in Breed includes a transducer arranged to receive waves from a space above a portion of a seat, and a signal representative of the presence and or position of the occupant is generated based upon the waves received by the transducer. In Breed, the determination of whether an occupant is leaning against the door or is possibly adjacent to the airbag module is important. "In these cases, deployment of the side airbag can be suppressed. In the alternative the time at which deployment of a side airbag starts, the rate of gas flow into the side airbag, the rate of the gas flow out of the side airbag and/or the rate of deployment of the side airbag is/are controlled." Breed, Abstract.

However, Breed and other prior art systems have limitations that do not allow them to meet the new government regulations, which require more precise grading of passenger presence and weight class, in an economical system. For example, the computation of the relevant forces to determine the presence, size and location of a passenger in Breed requires use of a complex algorithm dealing with a neural net. Such methods are complex and require sophisticated analytic techniques and devices.

Optical fibers have been used for many years for communication through transmission of light. The characteristics of optical fiber are well known, and fiber has been assembled in any number of configurations. Those skilled in the art have come to understand that in communication applications the fiber should generally remain relatively straight, preferably subject to turns no tighter than a certain defined radius so that the transmission of light is attenuated as little as possible. The discussion of choice of fibers and conditions for maintaining a relative flatness are described, for example, in Wiener, U.S. Pat. No. 5,256,468, which describes a type of organization of the fiber optic groups or cables, in which they are held in approximately parallel position and secured by secondary fibers to form a woven mat. By choosing the conditions of weaving and appropriate parameters for materials, the optical fibers can be arranged in a highly parallel and highly planar arrangement, which still permits flexibility of the overall structure without damage to the optical fibers. The fiber matrix may include an elastomeric or resilient coating or support to give the entire structure more stability and protection, as well as to preserve the structural integrity of the optic fibers. The coating and innovative weaving technique enable greater bending with minimal attenuation.

The design of such a woven mat can be modified in a variety of ways. One skilled in the art will understand what choices of material thickness, flexibility, dimension, spacing, and number of optical fibers, and such are appropriate to design an optical matrix with a variety of desirable properties.

In addition to such applications, various fiber optic devices have been used to measure forces, for example, vibration. See, e.g., Tsai, U.S. Pat. No. 7,110,626.

One prior type of fiber optic sensing systems is based on wavelength variations and phase shifts as a function of strain for measuring pressure, weights, or other forces. These systems generally utilize a system of Bragg gratings, and require expensive measuring systems such as interferometers. The costs of such systems are prohibitive in consumer based products such as automobiles. Consequently, many other techniques have been explored in automobiles in regard to sensing the weight and/or position of passengers for appropriate airbag deployment. However, prior to the present invention optical fiber has not been so used.

Many of the solutions presently considered state of the art are very complex, and a more simple and straight forward solution would be useful. What is desired is a simple, robust system for determining both the weight and position of an automobile seat occupant.

SUMMARY OF THE INVENTION

The present invention describes a system and method for sensing loads on a surface. In one embodiment described herein, it includes a technique for protecting an automobile passenger during an accident by ensuring, when an impact takes place, that accurate and meaningful information about a passenger in a seat can be obtained to appropriately enable an airbag control system. However, the basic sensor has potential application in a wide variety of weight sensing applications.

Deformation of an optical fiber can be detected by measuring the attenuation of light passing through the fiber under the influence of the deforming force, such as pressure. This makes a useful weight detection system, as will be further described below. The attenuation can be converted to a weight value corresponding to a mass or force acting on the fiber. By providing a series of fibers in physically distinct positions, information about weight in different locations can be obtained, which provides information about the distribution of weight over an area of interest, thereby providing useful information about the weight and position of, for example, a passenger.

The basic form of the sensing system includes an optical fiber positioned relative to one or more supporting resistance elements such that when a force acts on the optical fiber to deform the fiber relative to a resistance element, light passing through the fiber will be attenuated. The degree of attenuation provides useful information about the amount of weight acting on the fiber. By designing a suitable environment for the fiber, its support, and defining how forces can act on the fiber, and by suitable calibration of the system, useful information about impinging forces is readily available. In a preferred embodiment, a mat containing a number of fibers is positioned under a seat cushion so that a person sitting in the seat will deform the fibers in the mat so that information about the person's weight and position can be readily obtained.

The modification of light passing through an optical fiber is known for sensing systems, particularly using what are called Bragg gratings. See for example, U.S. Pat. No. 7,091,472, in which a sensor interface includes a sensor, an optical fiber, a Bragg grating disposed on the optical fiber, and an optoelectronic circuit. The optical fiber with Bragg grating transmits light in a manner indicative of a force-induced strain which is a function of the parameter sensed. The optoelectronic circuit reads the sensor by illuminating the Bragg grating with a light pulse carried by the optical fiber and detecting the timing and/or frequency of the light reflected by the Bragg grating. The timing and/or frequency of the light reflected is a function of the strain imposed on the Bragg grating. Such systems provide highly precise measurements, but the apparatus is expensive and somewhat complicated. Bragg gratings can be used in conjunction with the present invention, but are not required for implementation of the invention.

As stated, one use of the present invention is to sense the presence of an occupant in an automobile seat, including the weight of the person, and preferably also the position of the person in the seat. The weight of a person is important in that there are both federal guidelines as well as safety guidelines for how persons of varying weights should be protected by an appropriate deployment of an airbag system. For instance, in an accident situation, for a very light person there should be little or no airbag deployment as a large, i.e., high rate of airbag deployment can be harmful to a light-weight occupant. A full-size occupant should have a full airbag deployment for maximum protection of the individual. There are various intermediate sizes of individuals and corresponding rates and types of airbag deployment for various sized occupants.

A system according to one embodiment of the invention is capable of defining the weight distribution, and thereby the position, of an individual. Information about the position of a passenger can be useful in an intelligent deployment of an airbag, for example, by modifying a deployment if the passenger is not at the optimal position relative to an airbag ("too close" or such).

There are other variable factors that can affect such deployment, including the distance the seat is forward or back or other position information about the seat with respect to any applicable airbag. Having a seatbelt fastened is helpful both to stabilize a person in the event of an accident, as well as to deploy one or more airbags in a manner sensitive to the position of a person. If the seatbelt is fastened, then the position of that person is more easily predicted or more accurately ascertained.

The system takes measurements at different times in order to track changes in passenger weight and position. These measurements are used to ensure that the system is operational. A very important time is shortly before a triggering event, such as an accident. Typical systems in modern automobiles detect sharp forces that trigger airbag deployment. This information can be linked with a passenger detection system so that the actual deployment can be modified as appropriate based on passenger weight and position. It is thus helpful to have an accurate snapshot of this information at the time of the triggering event. In general, one or more measurements are taken at a time that can be used for calibration of a zero-weight condition (i.e., an empty seat). These measurements can be stored, and made available later as a reference for comparison with an active load, indicating the presence of a person in the seat. A measurement taken shortly before, or perhaps in conjunction with a triggering event, can be used to quantify an occupant weight and to characterize the person's position.

In addition to these vehicle applications, the invention may be useful in a wide variety of weight sensing or determining systems in applications other than automobiles or airbag deployment systems. One of skill in the art will understand how such systems may be used in seating applications generally, such as a military aircraft seat, aircraft seats generally, and seating in other vehicles such as trains or buses. Furthermore, the system may be adapted for use in cargo shipping. This may be useful in air freight applications where a load shift can lead to a dangerous instability in flight characteristics. Such a system may be generally useful in other shipping situations, such as in a semi-truck trailer, or in a railroad freight car, or in water-borne shipping.

In one embodiment, the invention utilizes a unique fiber optic sensing system capable of defining weight distribution. Based on the ranges of weight, an algorithm enables utilizing both the weight distribution as recorded by the sensing system and the range of weights to provide relevant information to the airbag controller.

As An apparatus according to one embodiment of the invention detects the presence and position of weight upon a relatively rigid and flat surface, particularly such as a car seat or underbody of car seat. Some embodiments provide such a sensor under the foam or along a flat base generally.

As above, the invention allows for measuring the weight and position of a passenger in an automobile seat. In some embodiments, such a determination and measurement is made at the time of or shortly before the deployment of an airbag system, which may be in response to an input selected to initiate airbag deployment.

In one embodiment, the invention provides a weight measuring system comprising an optical sensing system, a reference system connected to the optical sensing system, means for a weight to act on the optical sensing system, means for storing information about a weight measurement at a first time and at a second time, and means for presenting information about the weight acting on the optical sensing system at a second time.

Another use of the invention is to provide a method for measuring information about a mass acting on an optical sensing system, comprising providing a source of light to an optical fiber in an optical sensing system, measuring attenuation of light through the optical fiber, and deriving information about the weight and position of the mass acting on the optical sensing system.

In various embodiments, the invention may provide an optical sensing process to determine the seat position; include this information in the determination of appropriate airbag deployment; provide data to allow for Airbag Suppression; and/or include an optical matrix in the back of the seat to enable correct characterization of the car seat.

DETAILED DESCRIPTION OF THE INVENTION

Figure 1:
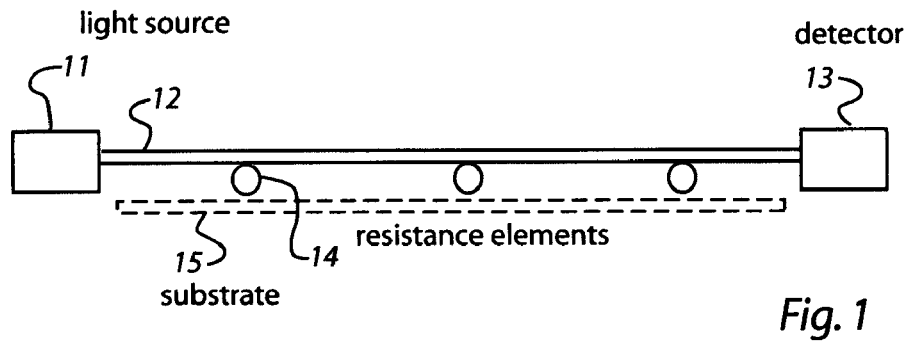
FIG. 1 illustrates a system containing a single fiber according to one embodiment a of the invention.

The present invention includes an apparatus and method for sensing the presence and weight of loads. In one specific embodiment, the invention may be used to determine occupant weight and the distribution of this weight in an automobile seat, to assist an airbag deployment system in selecting appropriate deployment of the airbag, i.e., with no, low, medium or full response, depending upon comparison of this data to a range of possibilities. In a typical installation, a side airbag and front airbag are individually positioned and controlled, although there may be some degree of integration of the sensors or activation devices connected with deployment. A simple sensing system of one embodiment of the invention can provide data suitable for input to airbag control or computer systems. Such a system can differentiate positions and weights, distinguishing an infant or child from a small adult or normal sized adult.

The system may use a fabric sheet containing fiber optic sensors and bend radius shifts along the fibers to detect weight along each fiber. By using multiple fibers in different locations, weight may be detected in those locations. In one embodiment, fibers are arranged in groups, approximately parallel, and positioned across a seating area. By examining signals in respective fiber groups, information about the weight of a passenger as well as information about the position of a passenger can be derived. The nature of attenuation varies depending on whether a passenger is sitting relatively forward or back in the seat. This is useful in choosing a deployment of an airbag since a person sitting relatively forward might be presented with a deployment which is different from a deployment when the person is seated well back in the seat. The sensor may also be able to distinguish live from non-live loads.

In one embodiment, a seat pan includes a standard spring assembly plus a set of cylindrical semi-rigid or rigid rods affixed across the seat pan so as to form a set of ridges approximately ¼ to 1 inch in radius. A fabric sheet including the optical fibers (to be described in more detail below) is placed on top of these ridges, configured to be approximately flat. Light sources and light detectors are positioned appropriately for the optical fibers so as to measure attenuation of light passing through the fibers. Measured light is analyzed and a processing unit reports weight thresholds, and other parameters chosen in the system.

The components of one embodiment of the present invention include a sensor unit, the structure and operation of which was described briefly above. A "reference unit" includes a computational device or system that collects and processes information from the sensor unit, and provides outputs or has connection to other systems in the automobile environment. In one embodiment, the reference unit is programmed with weight threshold parameters and reports out sorted values. The government has suggested four weight categories; the system is set up for these four weight categories and can deal with any variations. The reference unit can process specific weight information from the sensing system and then report simply one of four category values as a weight parameter. This makes it easy to signal or provide information to other automobile components, specifically an airbag deployment control unit. The weight thresholds are related to requirements set forth by standard FMVSS208.

One use of the invention is measuring weight, especially live weight. To this end, the system may measure weight inputs at various times and conditions. To ascertain a minimum or zero weight status, the system may measure attenuation values when the ignition of an automobile is first turned on. However, since seats are often occupied at this time, the system may also take readings when the ignition is off. In particular, the system may take one or more measurements at a time after the ignition is off, for example ten, or thirty, or sixty minutes after the ignition is turned off. One skilled in the art can choose any of several schemes for measuring attenuation values to derive a tare or zero point value. Any number of values can be stored for reference in additional determinations used by the system.

The system may take in a signal that the car is ready to move, ignition on, and then sense the occupancy state of the vehicle and store this in a control memory. Previous to the car being ready to move and when occupants are out of the car, the system may define a zero point. At that time, it may detect objects left in the seat. It may take zero readings at various times, minutes apart or longer as set by the user, to ensure or to provide a return to zero of the system when not in use and to record if things left are on seat. The reason for these multiple readings is to test the system, track passenger changes, i.e., seat switching, etc., in order to correctly identify passenger parameters at the outset of the journey and changes in position if passengers move to different seats (easy in certain vehicles) or move around on a seat (shifting forward to reach a car control of some sort, relaxing backward). The system may take readings at selected intervals. These intervals can be as short as microseconds or as long as minutes or hours, ¼ hours in travels, etc. These intervals may vary, for example based on whether changes are detected in sequential measurements. However upon a threshold deceleration or perceived threat whether avoided or not the system may take a special "incident-time" reading and report these parameters to the reference system. This data thus received may be immediately made available to the airbag control system with the present weight range and position of the occupant.

The system may thus take account of items or accessories on a seat. An important example is a car seat for a child or infant. It may be desirable to measure the weight of the occupant of the car seat, not including the car seat itself. By taking repeated measurements, the system may differentiate a component of live weight, which is to say the weight of the child or infant and/or adult.

The present invention may be useful for other applications, particularly for weight sensing generally. As one example the present invention may be useful for ascertaining where a person may be positioned on a seat. The present invention may also be useful in a sensing mat. Such a mat might be used on the floor of a cargo storage hold, such as for an airplane or truck-trailer, but also for water-borne shipping and other transportation applications. In the event cargo is moved, either during loading or during transit of the vehicle, this information may be ascertained by testing the signals available through this sensing mat on the floor. It may be helpful to know if weight in an aircraft has shifted in a cargo hold, particularly during flight, as this can impact performance and flying characteristics of the airplane, sometimes quite detrimentally. Such shifts may be significant for water-borne shipping as well and may have some impact on rail or truck-trailer shipping.

The reference unit can take many forms. In one embodiment, an optical electronic receiving device capable of outputting a voltage based on incident light is connected to receive light through an optical fiber or group of fibers. This voltage is connected electronically to the reference system. The outputs may be sent to a unit which serializes the information such that each group of fiber optic strands is correlated to a location. This component may include a multiplexer with a defined clock structure. The processing unit may be a multiplexer, memory, gates, processor/computer (see FIG. 8) or all of the above. The information may be processed by a computer, controller, comparator, or other analytical or computational device. Such a system can output a value representative of the weight at a position on the seat and a maximum signal representative of its overall size and/or forces on the seat.

The fiber position data will show the focal point of the passenger weight. The greatest differential signal determines the focal point of the weight distribution, which allows a determination of position when taken together with the individual signal levels of the other outputs. The signal which defines the maximum deformation of the fiber, when taken with the other deformation signals, will determine the weight and relative position of the occupant.

The serialization is not to achieve a joining of information but rather to enable interrogation independently due to the relationship of the deformation to the seat. The serialized signal contains specific data relating to the seat at a specific location.

Figure 4:
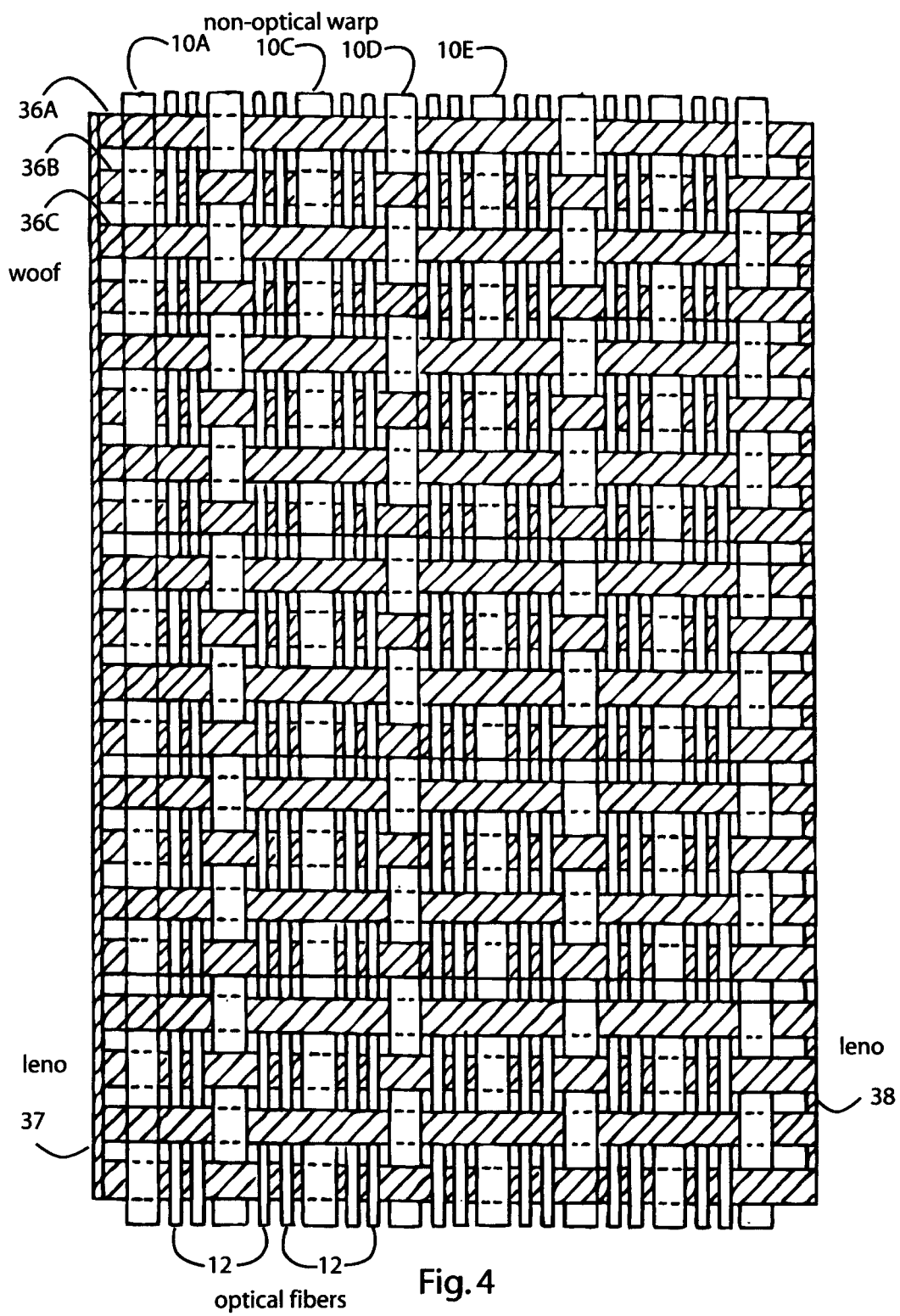
FIG. 4 illustrates an optical fabric such as might be suitable for use with the invention.

Turning now to the drawings and referring to FIG. 1, in one embodiment light source 11 is in communication with optical fiber 12, which in turn is in communication with detector 13. Optical fiber 12 passes over one or more resistance elements 14. In the embodiment shown there are three resistance elements 14. While one optical fiber 12 is illustrated here, a plurality of optical fibers 12 may be arranged in groups, which may conveniently be groups of 2-12. A group of two optical fibers is used in one embodiment. Each group is preferably woven such that they are parallel with respect to each other as shown in FIG. 4. This will be described more completely below.

Resistance elements 14 may conveniently be approximately as long as the measuring area. These resistance elements 14 may be positioned along the length of the optical fiber to optimize the variation in attenuation along the fiber. Resistance elements 14 may conveniently be the elastic element of material widely available as "bungee" cords. Resistance elements 14 may be any suitable size that will support optical fiber 12 and encourage formation of microbends in the weave under an incident force. A rod with a diameter of 0.25 to one inch may be particularly suitable. One factor that may be considered in choosing resistance elements is the feel that will be transmitted to an incident weight, i.e., a passenger. Particularly in automotive seat applications, the size, support and spacing of the resistance elements should not make the seat feel lumpy, at least not to the point of distraction to a passenger. The resistance elements do not need to be circular in cross-section, although this may be a convenient shape.

In general, it is desirable to have compatible performance parameters among the light source 11, optical fiber 12, and detector 13. The light source should preferably provide one or more frequencies of light that are easily detectable by detector 13 and transmitted by optical fiber 12. In one embodiment, light source 11 is an LED having an optical performance optimized at 660 nm. Such an LED is readily available and provides for good performance with plastic fiber, but other frequencies are possible and well known in the art. Light source 11 should be chosen in connection with a light detector 13 that is available and provides good response at the same frequency. Some useful detectors 13 have their best performance at 850 nm but it is known that detectors that are useful at 660 nm are readily available. It may be desirable to provide the best possible performance in comparison to the cost. Other devices are also available. A person skilled in the art can make similar optimization choices.

Care should be taken to avoid light loss in connecting light source 11 to optical fiber 12 and optical fiber 12 to detector 13. Light source 11 and detector 13 may be butted up against the optical fibers 12. The technique to avoid light loss from these devices through direct interconnection is known to those skilled in the art. It is recommended that the light source 11 have minimal viewing angles and that the detector 13 have large active area values at the frequency of the source. It is desirable that the light source 11 and detector 13 have matched frequencies, but it is sufficient to have source and response curves that overlap. This may be true particularly if a closely matched source and detector combination is unduly expensive, or perhaps not readily available. A balance can be achieved depending on the ratio for optimal detection for a given set of light source values and frequencies and detector capability. One skilled in the art can select these parameters and optimize them as desired. In one useful embodiment the chosen wavelength was 660 nm. Due to the cost of detectors, one detector used was centered at 850 nm but useable at 660 nm, and the range of operation for this combination appeared to be acceptable.

Substrate 15 can take many forms. It may be more or less solid, or not solid or rigid, or even a single piece. The important thing is that when enough pressure is applied against optical fiber 12, driving it towards resistance element 14, there will be some change in the shape of optical fiber 12 as it presses against resistance element 14. The platform need not be solid; however, it should provide sufficient support for resistance elements 14 to cause the formation of microbends in optical fiber 12. If substrate 15 is present, it will stabilize and resist movement of resistance element 14. In one simple embodiment substrate 15 is a platform which is approximately flat. One possible material for substrate 15 is a sheet of metal. Another possible substrate is a perforated pressed wood composite, Masonite™ sheeting, or the like.

In some embodiments, resistance elements 14 may have sufficient integrity such that they do not require a substrate 15. For example, an elastic material could be bound with an inelastic material and formed as resistance elements 14. In another variation, resistance elements 14 could include very strong fibers that can be constrained in a frame and provide sufficient structure to facilitate formation of microbends in optical fiber 12 without additional support from a substrate such as 15. A resistance element 14 may have tensile strength sufficient to support optical fiber 12 so that light passing through the fiber will be modified when a force is applied to the optical fiber.

Figure 2:
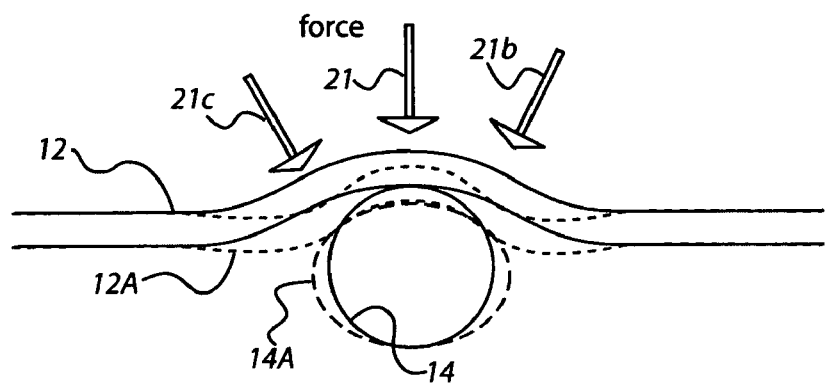
FIG. 2 illustrates deformation of a fiber against an opposing resistive element.

Referring to FIG. 2, a force 21 acting to press optical fiber 12 against resistance element 14 is sufficient to deform the optical fiber 12. Such deformation is illustrated here as fiber 12A and resistance element 14A. In addition, forces 21b and/or 21c can cause optical fiber 12 or 12A to wrap around or against resistive element 14, deforming the shape of the optical fiber. If a bend of appropriate radius is induced in the optical fiber (i.e., a microbend), light transmitted through the fiber typically will be attenuated. This attenuation can be detected and analyzed. With suitable calibration, this information provides information about the force incident on the optical fiber. This translates readily into a measure of weight for a passenger sitting in an automobile seat and pressing down on such an optical fiber positioned in or near the seat and impacted by the passenger so seated. One skilled in the art can select appropriate optical fiber and resistance materials to obtain a useful amount of attenuation for a given application.

A human body does not present a point source for force, so a combination of force vectors including 21, 21b and 21c would be expected. By providing multiple points along an optical fiber for detecting such incident forces, information about incident weight, i.e., the weight of the passenger, may be readily obtained. Further information may be available if measurements are taken along multiple fibers positioned in different locations in a seat or by some other sensing system.

Figure 3:
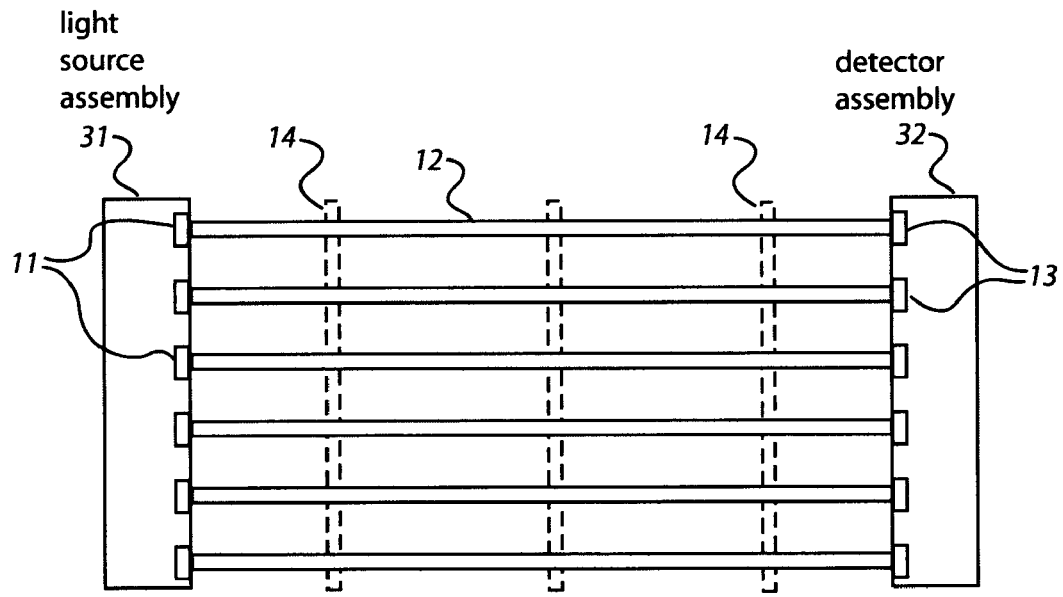
FIG. 3 illustrates a matrix of multiple fiber groups including multiple light sources and detectors.

It may be useful to use multiple optical fibers or groups of optical fibers, so as to take measurements at different positions. Referring to FIG. 3, in one embodiment, multiple light sources 11 are in communication with corresponding optical fibers 12 (which may be a group of fibers), each of which is in turn in communication with one of a plurality of detectors 13. In other words, each light source is in communication with a detector unit through one such fiber or group of fibers 12. One possible number is 12 fibers or groups of fibers. One possible spacing between group centers is approximately one inch. Resistance elements 14 are laid out much as shown in FIG. 1, and conveniently may each be a single unit that extends across the measurement area. The light sources may be stabilized or mounted on light source assembly 31. Similarly, detectors 13 may be stabilized or mounted on detector assembly 32.

FIG. 4 is a plane view of a structure fabricated according to one embodiment of the invention. As illustrated, the structure is woven with warp strands 10A, 10B, 10C, 10D, and woof (or pic) strands 36A, 36B, 36C and 36D. The warp and woof strands are woven together into a fabric-like structure using a modified plain weave as discussed in U.S. Pat. No. 5,256,468. Any desired material having the physical properties desired for the application may be employed as the warp and woof strands. For example, the strands may comprise fiberglass, graphite, silica carbide, or other materials. The selection of auxiliary fiber in the matrix is related to temperature constraints of the application, ease of handling, and required outside diameter (O.D.) with respect to the O.D. of the optical fiber.

The fiber optic may be step-index plastic optical fiber (POF) with a 500 micron core. It may be graded index POF or glass fiber depending on the specific application, cost parameters, etc. The core size can vary, that is, different core sizes may be used. The deformation of the core is greater with greater core size. The optimal size of the core relates to issues in manufacturing, such as, for example, the other interacting fibers. Cost may also be a consideration. The non-fiber optic strands may be fiber glass; fiber glass has a desirable temperature range for utilization in vehicles. Other material may be used depending on the application; a partial list includes silica carbide, carbon, cotton, hemp, nylon, etc.

Introduced with the supporting warp fibers 10A, 10B, etc., before the weaving are optical fibers 12A, 12B, 12C, 12D, 12E and 12F. The optical fibers are introduced into the structure to run in the warp direction being held in zero warp. That is, in zero warp the optical fibers are held approximately straight and parallel in the warp direction. The effect of the structure in which the optical fibers are supported is a minimum of micro-bends or crimps in the optical fibers, thereby providing maximum optical efficiency and repeatability of signals regardless of their transmission position within the woven structure. It is well known that when signals are transmitted through optical fibers, losses occur wherever bending or kinking of the fiber is present. The structure shown in FIG. 4 includes a pair of optical fibers in the channels formed by non-optical warp strands 10A-10D. Of course, more or fewer optical fibers may be employed. Two fibers per channel appears to be useful, as does two to four and six to twelve fibers. In this application, one factor in selection of optical fiber and non-optical fiber is government requirements relating to temperature.

The structure such as depicted in FIG. 4 can be coated with a protective coating material to hold all fibers in place. In one embodiment, coating 20 consists of a well known material such as an elastomer, a rubber epoxy, or other suitable material, which holds the optical fibers in position with respect to the surrounding structure. Additionally, coating 20 may limit or prevent moisture from entering or exiting the structure, and may be employed to assist in controlling the bend radius of the optical fibers. Coating 20 may also be useful in increasing the temperature range for the assembly.

FIG. 4 depicts a larger region of a structure woven according to one embodiment to illustrate the manner in which the woof strands are bound at the edges of the structure. As shown in FIG. 4, the optical fibers 12 extend from the top of the structure to the bottom, while the woof strands extend across the structure from left to right. Also extending from the top of the structure to the bottom are the warp strands discussed above in conjunction with FIG. 1. The edges of the woof strands 36 may be bound by a conventional technique using leno material 37 and 38. Of course, other techniques may also be employed to secure the edges of the fabric, for example by knotting them together, or simply by coating the structure before further processing.

For the embodiment depicted in FIG. 4, specific fibers such as those described above may be employed which may have a dimension of 1800 denier and be woven with a density of 44 optical fibers per inch. One acceptable fiber optic type for this type of application is 500 µm O.D. (outside diameter) POF (plastic optical fiber). The POF may be step index or graded index fibers depending on cost. A desirable temperature range is 85° C.; however, the elastomeric coating used in this application may enable the fabric to achieve that temperature or better even if the POF is quoted at 75° C. The density of the weave is defined both by the diameter of the optical fiber, the surrounding structure and the width of the teeth of the comb, and is variable as necessary depending upon the application, i.e. O.D. of the selected optical fiber.

Due to the nature of the fabric the weave material may also be incorporated in the seat back to give still further information regarding child car seats and children in such seats.

The length of the structure may be dependent on the length of the roll of material used, and very long structures, exceeding a kilometer in length, may be fabricated using existing commercially-available weaving equipment with adequate tension control methods applied—modifications may be required for this tension control. The optical fibers may be positioned, and the surrounding structure woven, using slightly modified conventional textile weaving equipment. For example, a composite generation facility with standard weaving equipment may be employed. A comb may be employed as part of the standard weaving equipment to position the optical fibers. The comb may be in the form of a small-toothed comb installed at the front end of the weaving equipment. Such a comb may provide a reproducible number of fiber optic strands between the strands of the intervening material and assures a non-overlapping condition with unbent optical fibers. Although various commercial machines will require different adjustments, during one test of the weaving operation, a change in tension occurred when the weaving spinner rollers ran out of fiber. This change in tension may cause breakage of the optical fiber, and accordingly the importance of controlling proper tension by suitable monitoring and maintenance of full rollers is believed to be important. It should be noted that, for optimum results and to avoid damage to the optical fibers, the number of pics per inch (woof strands per inch), and the operational speed of the weaving machine should be tailored to suit the types of fiber optic and non-fiber optic material used.

In one implementation of the present invention, a fabric is woven by a somewhat conventional textile weaving machine utilizing a modified plain weave as described in U.S. Pat. No. 5,256,468 such that fiber optic strands (one or more; preferably two or more) lie in channels as described in the '468 patent. In one embodiment of the present invention, the fiber optic channels, i.e., groups of fibers, are approximately 1 inch apart, across the width of the sensing mat. They may be likewise spaced across the length of the seat. While the width of the seat may be variable, the spacing of the fiber optic need not be. The number of fiber optic groups may vary as a function of the width of the seat or different spacing may be selected. The number of fibers in a group may be varied without changing the operational integrity of the matrix.

The apparatus of FIG. 3 comprises a sensor unit that may be mounted in an automobile seat or other appropriate location. In one embodiment, a primary mat is employed with parallel optical fibers oriented front to back (or vice versa) in an automobile seat. In another embodiment the primary mat may be oriented with the optical fibers going side to side across the seat. In still a further embodiment multiple fibers may be oriented front-to-back or back-to-front, and additional fibers oriented side to side, thus providing more information about the location of incident weight of a passenger.

Optical fiber may also be woven in the X and Y directions but the cost may be higher due to interconnect issues. This may result in a sharper definition of position front to back. Cost may not be advantageous in this more complex device. Nevertheless, certain applications may warrant such a structure. For example, a mat designed for laying on the floor of a cargo-carrying vehicle may advantageously include fibers in each of two more or less orthogonal directions. This may be two overlapping mats such as described above, oriented to provide X and Y information, or a more complex mat with X and Y optical fibers woven in.

Resistance elements 14 establish a deformation pattern across the matrix which is assisted by the weave itself. Due to the modified weave, the deformation is periodic and cumulative when pressure is applied. The weight produces multiple microbends across the fiber for each rod by the pressure applied as well as by closing the plastic cores down in the larger sense. This pressure across the seat is variable due to passenger weight distribution. Due to the modified weave, where there is no deformation, i.e., no incident weight, the system has limited attenuation, preferably minimum to zero attenuation. This provides for a simple zeroing system after passenger exit.

Figure 5:
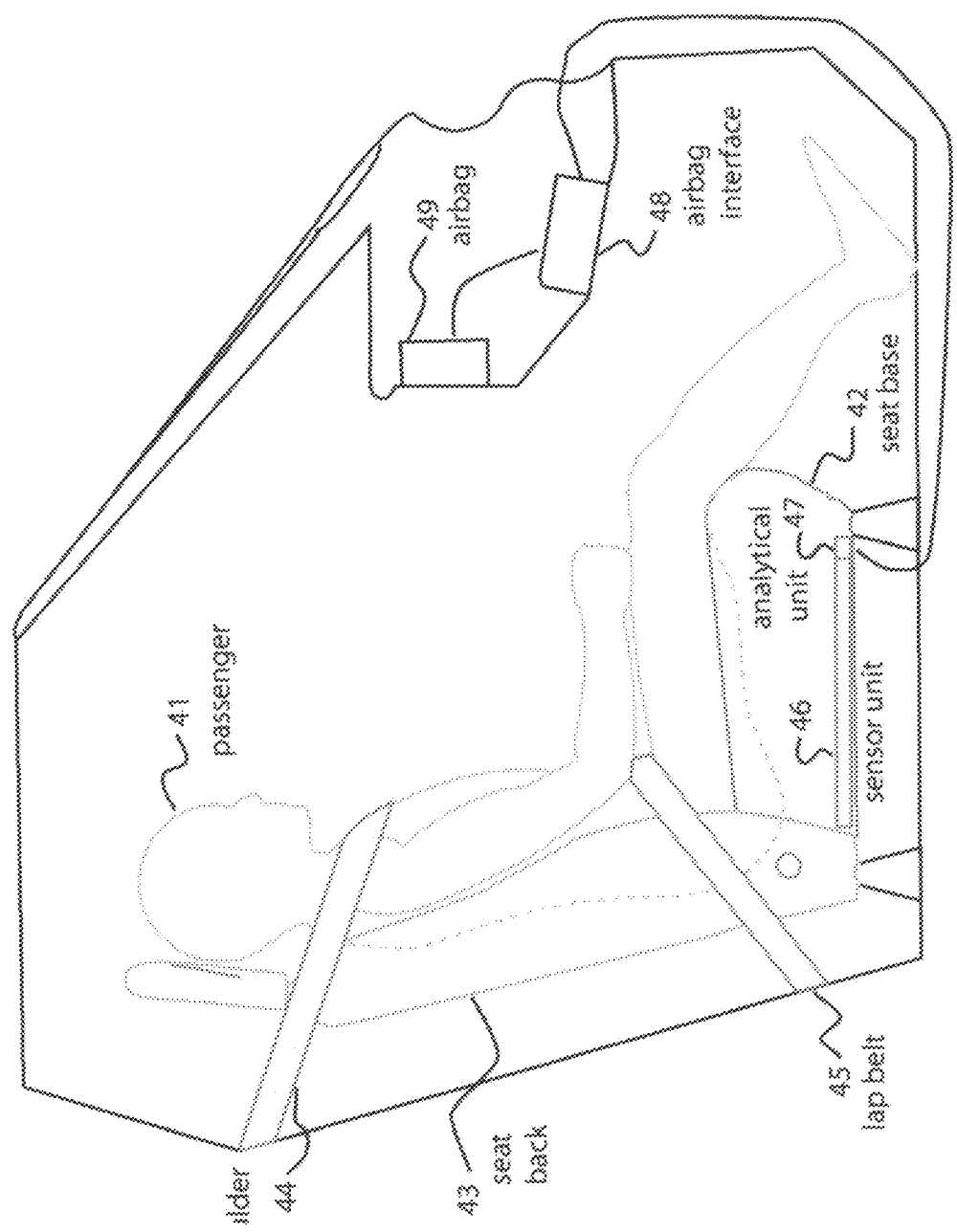
FIG. 5 illustrates how a sensor matrix might be located in an automobile seat with a passenger in the seat.

Referring to FIG. 5, in the illustrated embodiment passenger 41 is sitting on seat base 42 and sitting against seat back 43. Shoulder belt 44 and lap belt 45 are fastened as usual. Sensor unit 46 is connected electronically and perhaps physically to analytical reference unit 47. Reference unit 47 is connected to airbag interface 48, which in turn is connected to airbag 49. A similar airbag in the side door (not shown) may also be connected to a suitable interface, which may be the same airbag interface 48, or it may be a separate airbag interface, or it may be otherwise connected as understood by one skilled in the art.

Passenger 41 sitting on seat base 42 depresses the elements of the seat base against the sensor unit 46. Optical fibers 12 are pressed against resistance elements 14 and against a stable substrate 15. Light passing through fibers 12 is detected in detectors 13, and electrical signals are sent to the reference unit 47.

Figure 6:
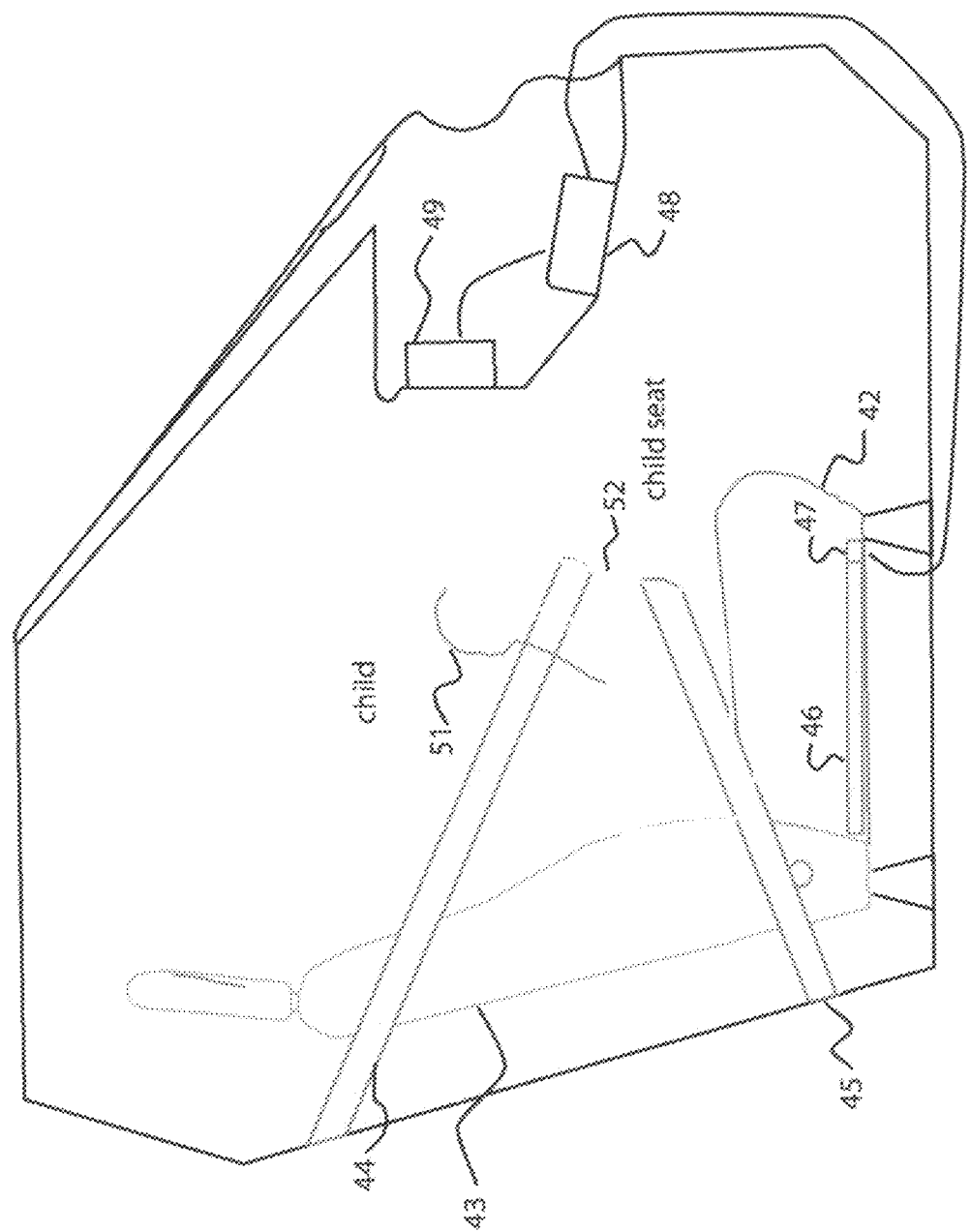
FIG. 6 illustrates a variation of FIG. 5 wherein the passenger is a child in a child seat positioned on the seat.

In other configurations, a different size or shape passenger may be in the seat. Referring to FIG. 6, child seat 52 holds child 51, and is secured by shoulder belt 44 and the lap belt 45 as well as any restraining belts which are part of the car seat.

Figure 7:
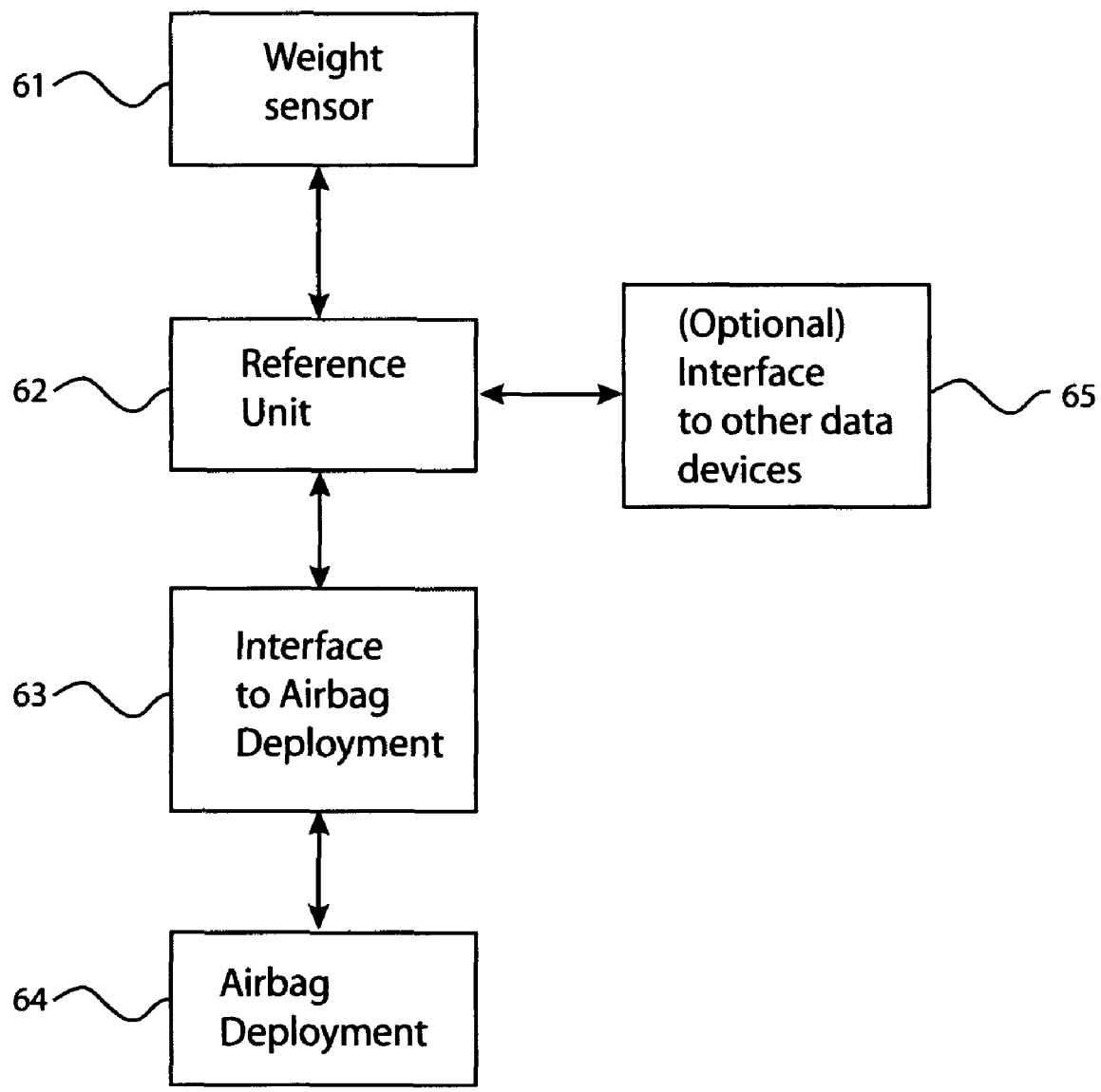
FIG. 7 illustrates a block diagram of the elements of one embodiment of the invention.

Referring to FIG. 7, a simple diagram of the functional blocks is illustrated for one embodiment. A sensor 61 is connected to a reference unit 62. The reference unit 62 may be connected to airbag interface 63 which in turn is connected to the actual airbag deployment apparatus 64. Various of these units can be combined as desired in manners well understood by one skilled in the art. Reference unit 62 may have a connection to optional interface 65 for communicating data or control signals to or from other devices. Interface 63 takes the data from the reference unit and provides signals to enable appropriate deployment of the airbag.

Figure 8:
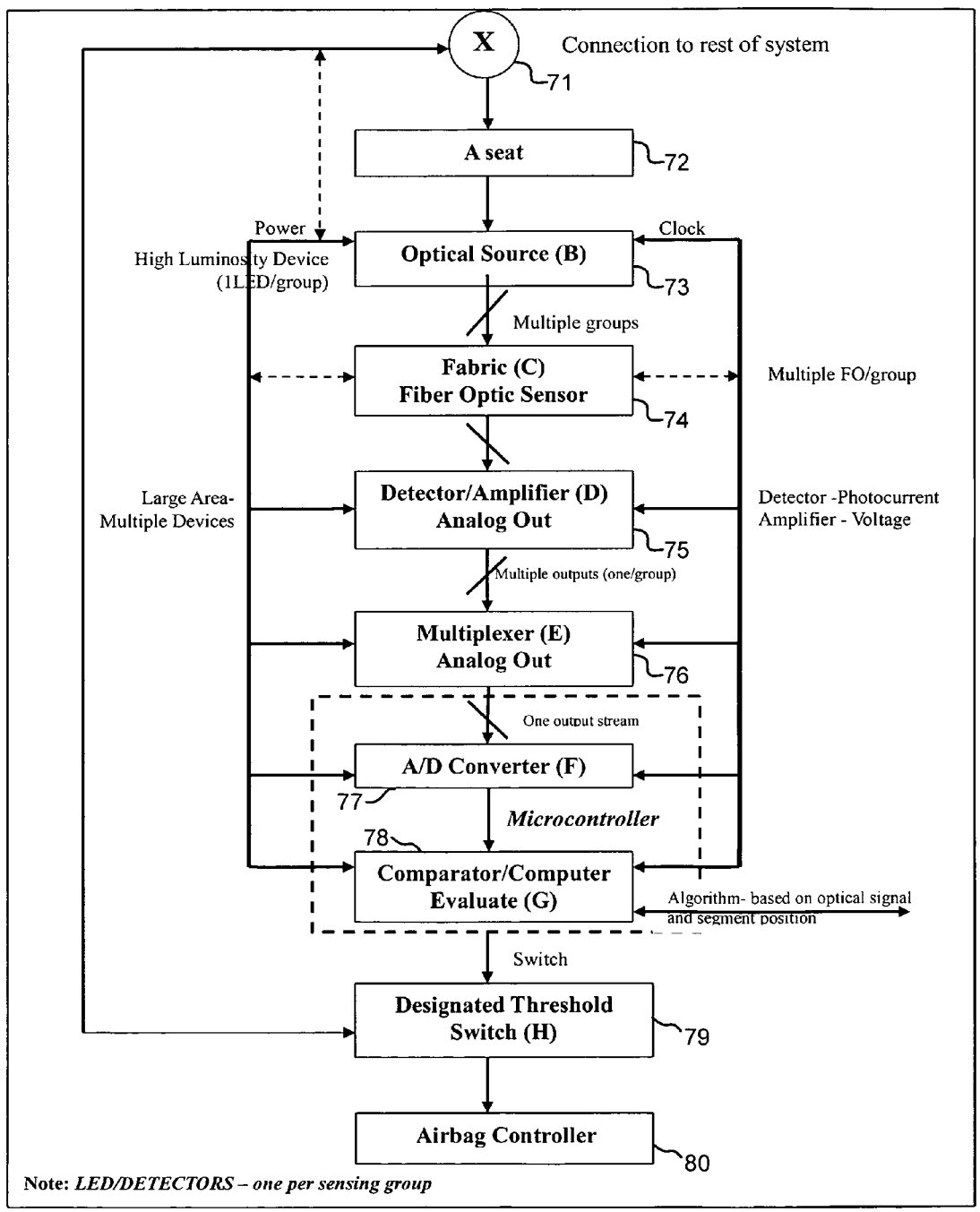
FIG. 8 illustrates another block diagram of the elements of one embodiment of the invention.

FIG. 8 demonstrates the actual signal flow related to the interrelated devices in one embodiment. The action demonstrated in FIG. 8 is as follows:

The detectors may have associated amplifiers or such amplifiers may be integral with the detector chip. In the illustrated embodiment, the conversion from light current to analog voltage is generated such that an analog multiplexor is utilized. Each detector amplifier provides a different analog voltage directly related to the group at the inch (lateral position) on the seat that is represented. The highest voltage obtained indicates the focal point of the passenger weight and his relative size. The variation in that maximum voltage reflects the position with respect to front and back. The clock drives the multiplexer, the data outputs represent the group and the numbers relate to side to side position. A comparator may determine the highest voltage achieved and relate that to weight. (Alternatively, the lowest value, i.e., greatest attenuation, may represent this focal point.) Clocks are generated as a function of the number of groups in the matrix; a master clock represents the length of the totality of groups across the seat. By multiplexing the outputs across the seat, the clock time (number) is directly related to a group at a position related to the width of the seat. This relationship provides data of the weight distribution across the seat. It is the function of the microcontroller or computer to establish the technique to relate the highest analog voltage to a specific weight range and front/back position. The single highest value will define the focus of the weight as it relates to the side across the seats as well as its front position as described above. The fact that the values are variable is not as relevant as the highest value across the seat at the time of deployment. That value compared to other values will define four factors: (1) where the passenger is across the seat, (2) where he or she is as regards front to back, (3) relative size of the occupant, and (4) action desired. Absolute size, etc., can be determined; however the range or relevant size signal should allow desired deployment of airbag. This range relates directly to switch position (See Algorithm Tables below).

The range of relevant size goes to a logic gate which has as an input the seat position and, if available, the signal of the seat belt. The output of the gates with these inputs can go into a switch which has as its output an enabling input to the airbag control system which can call up an appropriate deployment of the airbag based on the weight and position of the passenger as it relates to both front and side positions. It is known to those skilled in the art that a value that is analog can be converted to a digital word and stored in a memory of a computer or controller. That word stored is then outputted to a comparator which recognizes the digital word and outputs a signal which relates to a range for output to a switch or set of logic gates. The details of this process are familiar to those skilled in the art. The switch and logic gates have enough output lines to reflect the capability of the airbag system to provide variable rates for airbag deployment based on size and position of the occupant. If such variability in rates and amount for deployment does not exist in the airbag control system, suppression of airbag or deployment will be the only two choices. The outputs of the sensor system utilized is thus a reflection of the capabilities of the airbag control system. The output switch or gates may be configured at installation to reflect limitations of the airbag control system. These may be reconfigured to interact with an airbag system with greater capability at a later date.

Referring again to FIG. 8, this block diagram illustrates the process in more detail. In or connected to seat 72, an optical source 73 provides illumination for fiber optic sensors 74, which are a part of a fabric sensor, and light passing through the fiber optic sensor 74 is passed to detector/amplifier 75. In this embodiment, this detector/amplifier 75 has an analog output. The output may be passed to multiplexer 76, and the analog output of multiplexer 76 passed to the converter 77, which is then passed to comparator computer 78. Information from the comparator computer 78 is made available to an airbag control system. In one embodiment, the unit has a designated threshold switch 79, which communicates with an airbag controller 80. The system may be connected to the rest of the automobile system 71 or as otherwise desired. Elements in the system are provided with power as needed and, to the extent appropriate or needed, one or more clock signals, which provide the timing and define by number the position across the seat.

Figure 9:
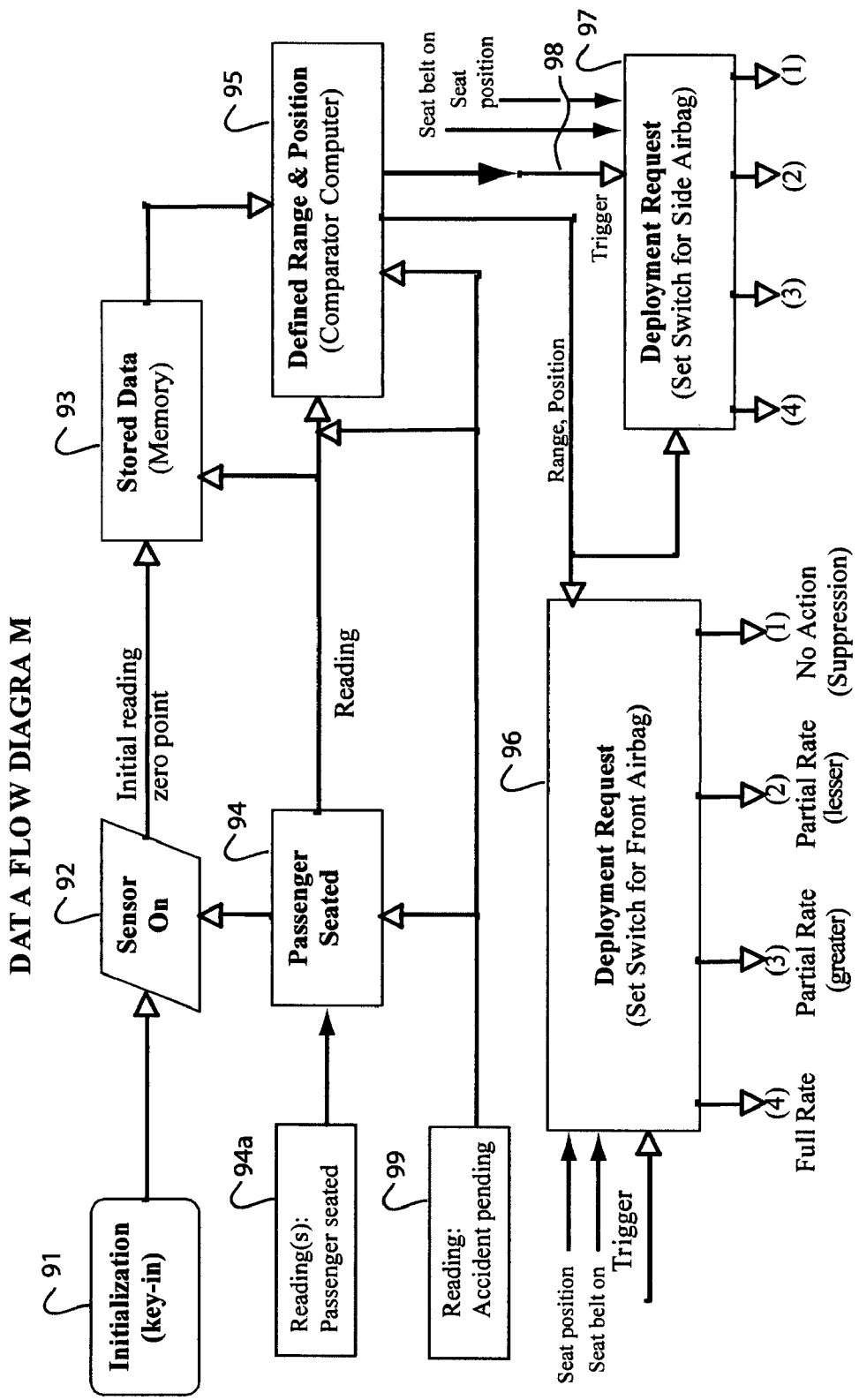
FIG. 9 illustrates data flow for the sensor matrix and analysis as related to airbag deployment according to one embodiment of the invention.

Referring now to FIG. 9, a data flow diagram of one embodiment of the processing of system is illustrated. At initialization 91a sensor is turned on at 92 for an initial reading of a reference zero, which information is passed to memory 93 and made available to comparator computer 95. An additional reading 94 can be made when the passenger is seated, which information is also passed to memory and to a comparator or computer. The values as generated by the comparator computer are passed to threshold switches 96 and 97 when an accident is imminent based on readings at that point in time. In one embodiment, the system presents outputs 1, 2, 3 or 4 from each of deployment request units 96 and 97, only one of which will be active at the time of a trigger event. These output alternatives may be: (a) no action—no person present or no person of weight appropriate for any deployment, (b) partial deployment for a small person—108 lbs to 125 lbs, (c) partial but greater deployment for small adult—125 lbs to 175 lbs, and (d) full deployment—more than 175 lbs. The thresholds can be varied to other values as may be appropriate for any specific airbag.

Periodic readings 94a can be taken to ascertain the then-current state of seat occupancy (and optionally seat position and seat-belt-connected status). A reading 99 can be taken in close proximity to the time of an accident to provide up-to-date information for guiding airbag deployment. A trigger 98 (from conventional sources connected or in communication with each of one or more airbags) signals a force threshold has been exceeded and airbags should be deployed in accordance with any needed input parameters.

Figure 10:
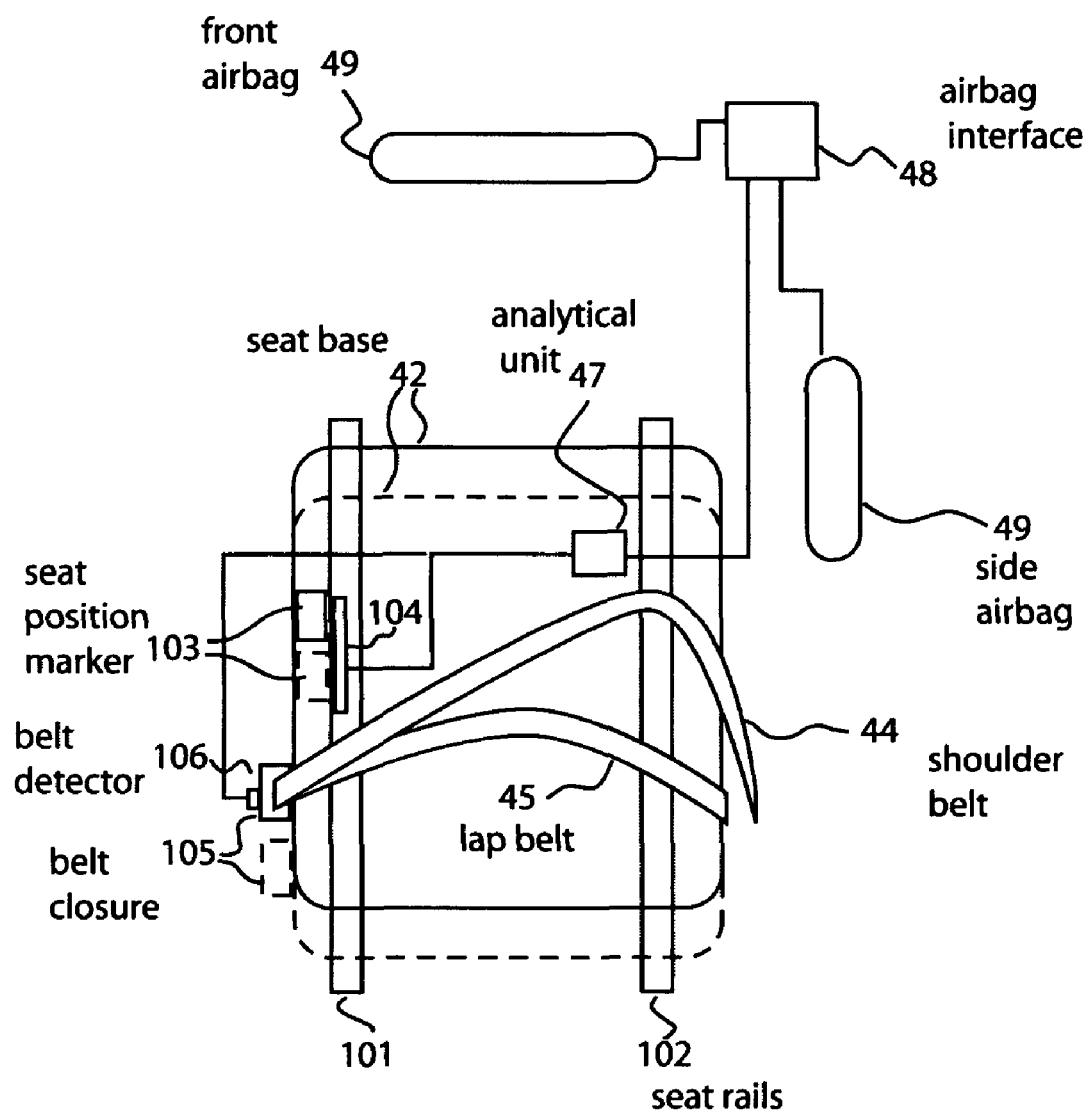
FIG. 10 illustrates some secondary devices that may be used with the invention.

FIG. 10 demonstrates an embodiment for establishing additional signals which provide inputs to the threshold switches as indicated in FIG. 9. The uses of these signals are indicated in the following algorithm. Two additional sensor signals are added to the threshold switches as indicated in FIG. 9, seat belt on and seat position forward. Seat position marker 103 may be placed in several positions within the rail 101 or be part of the rail structure itself. Seat position marker 103 may be a detector which by the value of the LED emitted light can correlate signal size with distance or it may be any of several devices which turn on or off depending on the signal from a detector which is part of each position marker. Light is available from a light source 104 which is moving with the seat along the rail. When the seat is forward a detector in that position may output a signal; in this instance the detector (position marker) may be placed in a series of fixed positions. Another embodiment may include an enclosed detector and LED in the rail itself and correlates the relative signals with the distances the detector and/or LED move. Those skilled in the art will be familiar with other electronic, electro-optic and acoustic techniques for developing such signal. The belt detector 106 and closure 105 is an integral part of most seats and presently a signal detecting whether the seat belt is on or off is part of the warning system in new cars. One skilled in the art can develop such a signal if a seat belt is available—combining this signal, seat belt ON/OFF is referred to in the algorithm as well as shown in FIG. 9. FIG. 10 illustrates the additional set of signals to the threshold switch as shown in FIG. 9 which can enable appropriate deployment of the airbag and thus safeguard the passenger.

This sensing system may be continuously or periodically active, providing data to the control system. The microcontroller may be oriented toward extracting relevant data and forwarding this to a set of switches which, based on weight and position, enables the airbag control system when required. In one pass the system may determine weight range and position of weight front to back, side to side. This data is set into threshold points and transmitted to the switch which provides this data to the airbag information module 96. Alternative inputs may include other relevant data such as seat position, and whether the seat belt is fastened. A logic gate assists in defining which signal relating to airbag deployment will be activated. The output of the threshold switches is relevant data for appropriate deployment of the airbag. Similarly these signals may go directly into the comparator computer so that its output is explicitly defined when data transfer occurs. Redundancy in communication may minimize errors.

This invention may desirably include answering certain questions. If an accident occurs at a point in time, it may be useful to know certain information related to airbag deployment, including: whether a seat is occupied; whether the occupant is a person or not; if so, the size/weight and position of the occupant; whether the occupant is in a child car seat; the distribution of the weight in the seat; the focus point of the weight from front to back and side to side; where the seat is relative to the frontmost position; and whether the seat belt is fastened.

There may be single or multiple outputs depending on the airbag type(s) available. If there is a single output, the choice is only to deploy or not deploy. If there are multiple outputs, different sizes and position may be related to different outputs in accordance with government defined weights. Thus, the outputs may be no deployment, i.e., no action; partial low, partial medium, or high deployment, where the number of choices depends on the features of a given airbag and how many partial deployments are available; and total deployment at the full rate. See the charts below.

A properly configured sensing system may be able to: enable suppression of airbag deployment of either the front or side airbags; detect if a child under 55 lbs is present, including child car seat; enable the correct rate or a suppression requirement for a child over 55 lbs or avoid deployment depending on where and what size the child is determined to be; enable the appropriate deployment for a small adult based on size and position of the person, including front to rear and side to side; detect and enable deployment for a large adult depending on position, including front to rear and side to side; and depict the distribution of weight which defines the rate of deployment in a multi-sectional airbag and thus react appropriately in any changing situation.

Thus, a single sensing system using a singular fabric can enable appropriate response for both front and side airbags. A simple system may be used to determine what a passenger is doing at the point of detection for potential deployment request. In some embodiments, it is a dynamic system since its data for the airbag use or suppression is active and is modifiable with respect to the nature of the measurements just before deployment, including position side to side and front to rear and changes in position and distribution of weight so that the system may control the rate of deployment and react appropriately in change situations.

Algorithm

One possible purpose of this system is to correlate weight and position in order to determine appropriate deployment of the airbag associated with a specific passenger based on the range of weight and to define threshold points for specific actions. In one illustrated system two optically measured values are structured to define the relative weight and position. These measured values of the human load may be based on position. This data pertaining to load may be sent to a computer, i.e. microcontroller. The computer may compare measured data to one or more defined ranges that the system has placed in suitable storage.

Four values can be chosen based on position both with front to back and any side relationships. Airbag deployment rates can consider both position and size. For a front airbag, these may be as follows. Where the seat is at a front position, the airbag does not deploy, regardless of occupant size. For a seat in the middle position, the airbag always deploys, but the deployment rate depends on the occupant size, and a partial deployment is possible. Where the seat is in the back position, there is always full deployment, but again the rate depends on the size of the occupant.

For a side airbag, where the occupant is near the door (extreme left or right respectively), there is no deployment, or perhaps a small cushioning on the passenger side. Where the weight focus point is in the middle of the seat (toward the right or left door), there is again a size related deployment, and the rate is controlled for children and small adults. Where the passenger is away from the door, there is a full deployment with the rate controlled for children and small adults.

During a trip subsequent measurements may be made in order to provide information that the load is the same and that the position of such load has not shifted primarily to assure that the system is operational. If the load has varied in position due to mechanical or human variations, the range for deployment should be maintained; however, the weight distribution has changed, which may affect appropriate deployment of side airbags and front airbags. The action decision is based on what is there when airbag deployment is requested.

Tables 1 and 2 present the possible variables based on the signals available that are plugged into the equations shown. Based on the tables and definitions outlined, a simple implementation is possible. One skilled in the art can develop other implementations based on these different scenarios.

ALGORITHM TABLE 1

| (Front Airbag) Equations: $X_r + Y_{Px} + Y_{Sx} + S^x = Q_r$ | | | | |
|---|---|---|---|---|
| $X_r$ | $Y_{Px}$ | $Y_{Sx}$ | $S^x$ | Q |
| $X_0$ | | | | Q |
| $X_1$ | $Y_{P1}$ | $Y_{Sf}/Y_{Sm}/Y_{Sb}$ | $S^0$ | Q |
| $X_1$ | $Y_{P2}$ | $Y_{Sf}/Y_{Sm}/Y_{Sb}$ | $S^0/S^1$ | Q |
| $X_1$ | $Y_{P3}$ | $Y_{Sb}$ | $S^1$ | Q |
| $X_1$ | $Y_{P3}$ | $Y_{Sb}$ | $S^0$ | Q |
| $X_2$ | $Y_{P1}$ | $Y_{Sf}$ | $S^0/S^1$ | Q |
| $X_2$ | $Y_{P1}$ | $Y_{Sm}/Y_{Sb}$ | $S^0$ | $Q_1$ |
| $X_2$ | $Y_{P2}$ | $Y_{Sf}$ | $S^0/S^1$ | Q |
| $X_2$ | $Y_{P2}$ | $Y_{Sm}$ | $S^0/S^1$ | $Q_1$ |
| $X_2$ | $Y_{P2}$ | $Y_{Sb}$ | $S^0/S^1$ | $Q_2$ |
| $X_2$ | $Y_{P3}$ | $Y_{Sf}$ | $S^0/S^1$ | Q |
| $X_2$ | $Y_{P3}$ | $Y_{Sm}/Y_{Sb}$ | $S^1$ | $Q_1$ |
| $X_2$ | $Y_{P3}$ | $Y_{Sm}/Y_{Sb}$ | $S^0$ | $Q_2$ |
| $X_3$ | $Y_{P1}$ | $Y_{Sf}$ | $S^0/S^1$ | Q |
| $X_3$ | $Y_{P1}$ | $Y_{Sm}$ | $S^0/S^1$ | $Q_2$ |
| $X_3$ | $Y_{P1}$ | $Y_{Sb}$ | $S^0/S^1$ | $Q_2$ |
| $X_3$ | $Y_{P2}$ | $Y_{Sf}$ | $S^0/S^1$ | $Q_1$ |
| $X_3$ | $Y_{P2}$ | $Y_{Sm}$ | $S^0/S^1$ | $Q_2$ |
| $X_3$ | $Y_{P2}$ | $Y_{Sb}$ | $S^0/S^1$ | $Q_3$ |
| $X_3$ | $Y_{P3}$ | $Y_{Sf}$ | $S^0$ | $Q_3$ |
| $X_3$ | $Y_{P3}$ | $Y_{Sm}$ | $S^0$ | $Q_3$ |
| $X_3$ | $Y_{P3}$ | $Y_{Sb}$ | $S^0/S^1$ | $Q_3$ |
| $X_4$ | $Y_{P1}$ | $Y_{Sf}$ | $S^0/S^1$ | $Q_1$ |
| $X_4$ | $Y_{P1}$ | $Y_{Sm}$ | $S^0/S^1$ | $Q_2$ |
| $X_4$ | $Y_{P1}$ | $Y_{Sb}$ | $S^0/S^1$ | $Q_3$ |
| $X_4$ | $Y_{P2}$ | $Y_{Sf}$ | $S^0/S^1$ | $Q_2$ |
| $X_4$ | $Y_{P2}$ | $Y_{Sm}$ | $S^0/S^1$ | $Q_3$ |
| $X_4$ | $Y_{P2}$ | $Y_{Sb}$ | $S^0/S^1$ | $Q_3$ |
| $X_4$ | $Y_{P3}$ | $Y_{Sf}$ | $S^0/S^1$ | $Q_2$ |
| $X_4$ | $Y_{P3}$ | $Y_{Sm}$ | $S^0/S^1$ | $Q_3$ |
| $X_4$ | $Y_{P3}$ | $Y_{Sb}$ | $S^0/S^1$ | $Q_3$ |

Parameter Defintions
$X_r$ = size - weight range
$X_0$ = less than 55 lbs
$X_1$ = greater than 55 lbs and less than 108 lbs
$X_2$ = between 108 lbs to 125 lbs
$X_3$ = greater than or equal to 125 lbs to 175 lbs
$X_4$ = greater than 175 lbs
$Y_{Px}$ = Position of passenger on the seat
$Y_{P1}$ = passenger toward front
$Y_{P2}$ = passenger in middle
$Y_{P3}$ = passenger toward back
$Y_{Sx}$ = Position of passenger in the seat
$Y_{Sf}$ = seat forward signal
$Y_{Sm}$ = seat middle
$Y_{Sb}$ = seat back
$S^x$ = seat belt on/off
$S^0$ = Seat belt on
$S^1$ = Seat belt off
$Q_x$ = Signal for suppress/rate of deployment
Q = Suppress = S1 (Threshold switch)
$Q_1$ = Low rate = S2
$Q_2$ = Medium rate = S3
$Q_3$ = Full rate = S4

ALGORITHM TABLE 2

(Side Airbags)
Equations: $X_x + Z_{Dx} + S^x = Q_x$
Left Door/Right Door

| $X_x$ | $Z_{Dx}$ | $S^x$ | Q |
|---|---|---|---|
| $X_0$ | $Z_{Ll}/Z_{Rl}$ | | Q |
| $X_0$ | $Z_{Lm}/Z_{Rm}$ | | Q |
| $X_0$ | $Z_{Lr}/Z_{Rr}$ | $S^0$ | Q |
| $X_1$ | $Z_{Ll}/Z_{Rl}$ | $S^0$ | Q |
| $X_1$ | $Z_{Lm}/Z_{Rm}$ | $S^0$ | Q |
| $X_1$ | $Z_{Lr}/Z_{Rr}$ | $S^0/S^1$ | $Q_1$ |
| $X_2$ | $Z_{Ll}/Z_{Rl}$ | | Q |
| $X_2$ | $Z_{Lm}/Z_{Rm}$ | $S^0$ | $Q_1$ |
| $X_2$ | $Z_{Lr}/Z_{Rr}$ | $S^0/S^1$ | $Q_2$ |
| $X_3$ | $Z_{Ll}/Z_{Rl}$ | $S^0/S^1$ | $Q_1$ |
| $X_3$ | $Z_{Lm}/Z_{Rm}$ | $S^0/S^1$ | $Q_2$ |
| $X_3$ | $Z_{Lr}/Z_{Rr}$ | $S^0/S^1$ | $Q_3$ |
| $X_4$ | $Z_{Ll}/Z_{Rl}$ | $S^0/S^1$ | $Q_2$ |
| $X_4$ | $Z_{Lm}/Z_{Rm}$ | $S^0/S^1$ | $Q_3$ |
| $X_4$ | $Z_{Lr}/Z_{Rr}$ | $S^0/S^1$ | $Q_3$ |

Parameter Definitions
$X_r$ = size - weight range
$X_0$ = less than 55 lbs
$X_1$ = greater than 55 lbs and less than 108 lbs
$X_2$ = between 108 lbs to 125 lbs
$X_3$ = greater than or equal to 125 lbs to 175 lbs
$X_4$ = greater than 175 lbs
$Z_{Dx}$ = Position side with respect to door
$Z_{Ll}$ = extreme left door; <4 inches from door
$Z_{Lm}$ = middle Left door; >4-8 inches from door
$Z_{Lr}$ = extreme right of Left door; >8-12 inches from door
$Z_{Rl}$ = extreme Right door; <4 inches from door
$Z_{Rm}$ = middle Right door; >4-8 inches from door
$Z_{Rr}$ = extreme right of Right door; 8-12 inches from door
$S^x$ = seat belt on/off
$S^0$ = Seat belt on
$S^1$ = Seat belt off
$Q_x$ = Signal for suppress/rate of deployment
Q = Suppress = Switch 1
$Q_1$ = Low rate = Switch 2
$Q_2$ = Medium rate = Switch 3
$Q_3$ = Full rate = Switch 4

Example of Algorithm Operation

Figure 11:
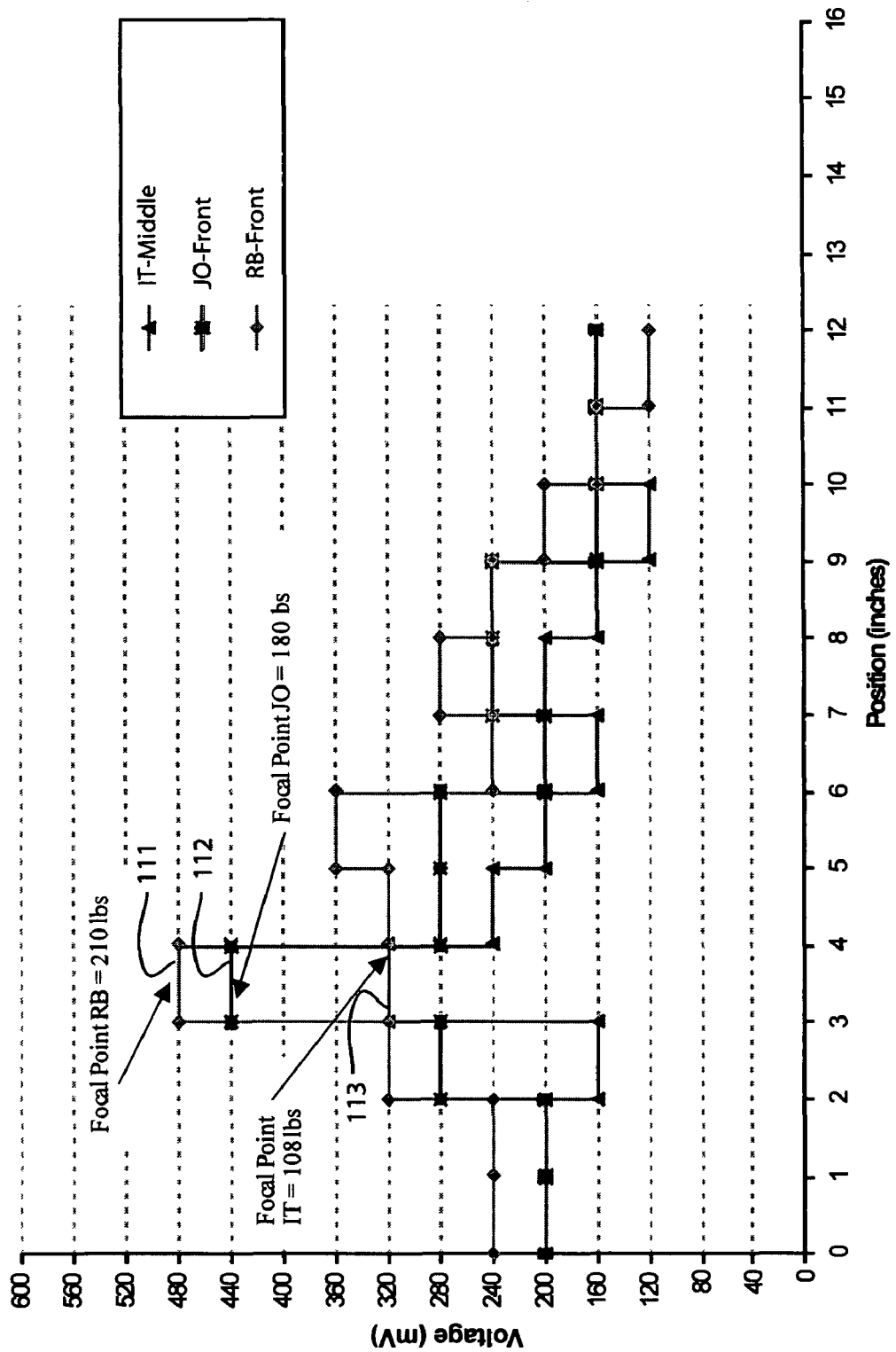
FIG. 11 illustrates a sensor graph with data such as might be generated for three different individuals sitting in a seat fitted with the inventive device.
Figure 12:
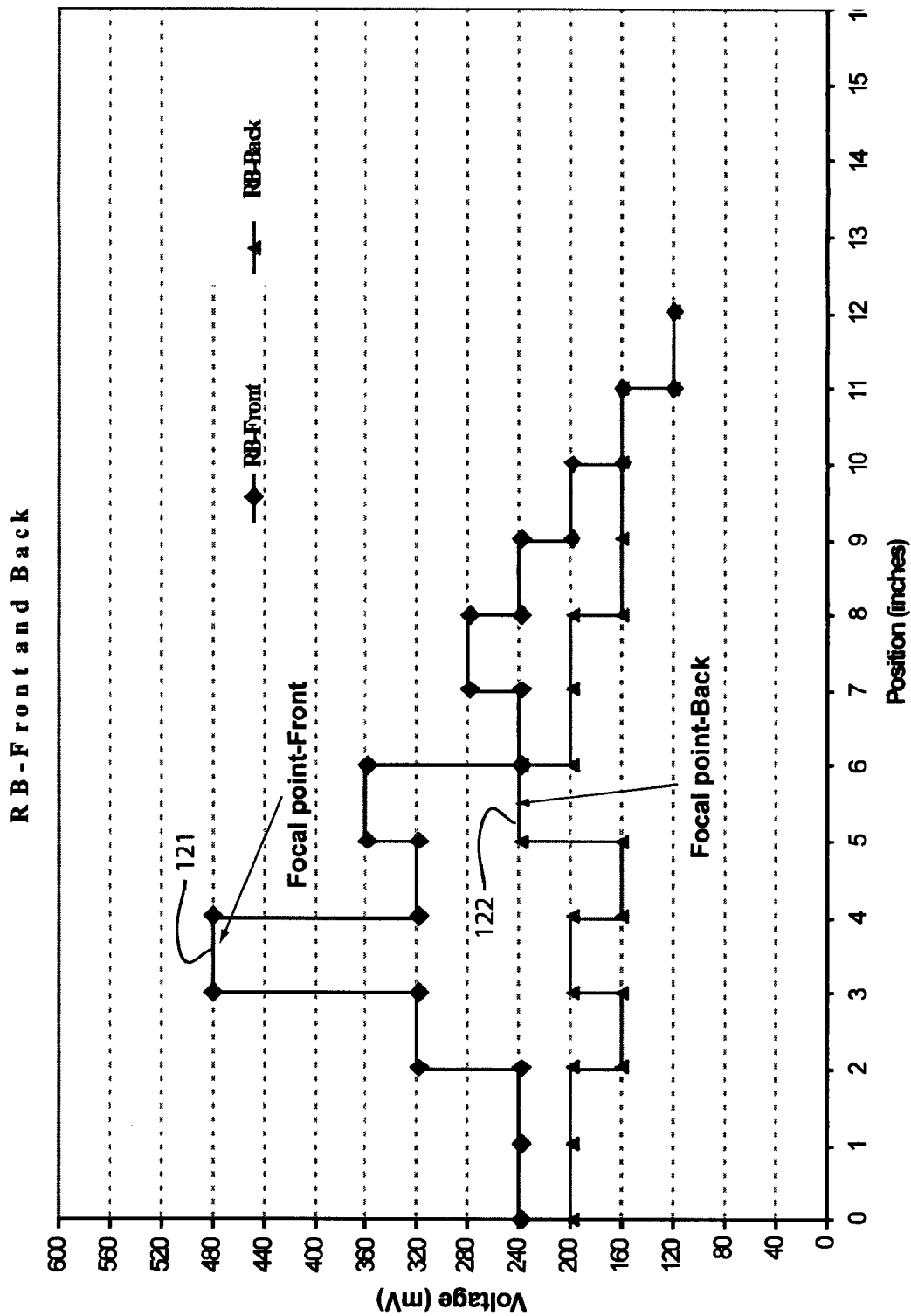
FIG. 12 illustrates a sensor graph with data such as might be generated for an individual sitting forward in a seat and the same individual sitting back in the seat.

FIGS. 11 and 12 represent results of using a system with variable weight, i.e. different test persons. In this example, the seat itself was skewed at an angle, and thus the center of sensitivity is offset, which is why the focal points are consistent across all individuals tested.

FIGS. 11 and 12 illustrate the results of tests in which a sensing mat was placed under a foam cushion and on top a composite board which was placed on top of the bottom of a metal seat frame. See also FIG. 5. Three individuals of different weights sat on the test car seat apparatus:

IT weight ~108 lbs

JO weight ~180 lbs

RB weight ~210 lbs

The tables are implemented based on the values indicated on the graphs. All the weights are shown as a value in millivolts. This placed the individual weights into a range as indicated in the figures. Definitions relating these to the tables are as follows:

IT=108 lbs=$X_2$; passenger seated in middle—seat in front

JO=180 lbs=$X_4$; passenger seated in front—seat in front

RB=210 lbs=$X_4$; passenger seated in front—seat in front

Zl1=less than 4 inches from Left door

Based on the front seat $S_{Sf}$ in the seat forward position, the action as regard airbags is shown below:

| Front Airbags (Seat Belts On) | Side Airbags (Seat Belts On) |
|---|---|
| IT = $X_2 + Y_{P2} + Y_{Sf} + S^0 = Q$ | IT = $X_2 + Z_{L1} + S^0 = Q$ |
| JO = $X_4 + Y_{P1} + Y_{Sf} + S^0 = Q_1$ | JO = $X_4 + Z_{L1} + S^0 = Q_2$ |
| RB = $X_4 + Y_{P1} + Y_{Sf} + S^0 = Q_1$ | RB = $X_4 + Z_{L1} + S^0 = Q_2$ |

FIG. 11 indicates along the X axis that the position of the focal point across the seat of the occupants is Z. The weight at the focal point defines the range X. This is only an example of many other possible configurations. One knowledgeable the art could detail others.

While this invention has been described in conjunction with the specific exemplary embodiments outlined above, many alternatives, modifications, and variations may be apparent to those skilled in the art. Accordingly, the exemplary embodiments of the invention as set forth both are intended to be illustrative and not limiting except as otherwise set forth in the claims.

What is claimed is:

1. An optical sensing system for detecting pressure exerted by a mass through attenuation of light in an optical fiber comprising:
   a first plurality of optical fibers;
   a second plurality of optical fibers that is approximately parallel to the first plurality of optical fibers;
   a support element against which the first and second plurality of optical fibers can move, such that a bend is created in at least one of the optical fibers in either the first or second plurality of optical fibers as a result of the pressure exerted by an object pressing against one or more of the fibers;
   a first light source for sending light beams through the first plurality of optical fibers;
   a second light source for sending light beams through the second plurality of optical fibers;
   a first detector for measuring any attenuation in the light beams sent through at the first plurality of optical fibers; and
   a second detector for measuring any attenuation in the light beams sent through the second plurality of optical fibers;
   such that at least one of the first detector and the second detector measure attenuation in the at least one of the optical fibers in which a bend is created.

2. The optical sensing system of claim 1, wherein the pressure results from the weight of the mass, and further comprising:
   a processor configured to derive the weight of the mass from the attenuation of the light beam in each of the at least one of the optical fibers in which a bend is created.

3. The optical sensing system of claim 2, further comprising a seat for containing the first plurality of optical fibers, the second plurality of optical fibers and the support element.

4. The optical sensing system of claim 3 wherein the seat is an automobile seat.

5. The optical sensing system of claim 2, further comprising a memory for storing information about the derived weight at a first time and at a second time.

6. The optical sensing system of claim 2, further comprising means for providing the derived weight to an airbag deployment system.

7. The optical sensing system of claim 2, wherein the processor is further configured to derive a position of the mass with respect to the support element from the attenuation of the light beam in the at least one optical fiber.

8. The optical sensing system of claim 7, further comprising means for providing the derived position to an airbag deployment system.

9. The optical sensing system of claim 2, further comprising means for setting a reference weight value.

10. The optical sensing system of claim 2, further comprising means for differentiating whether the mass has a fixed or dynamic weight.

11. A method for measuring the weight of a mass resting on an object, comprising:
- providing in the object a first plurality of optical fibers and a second plurality of optical fibers which is approximately parallel to the first plurality of optical fibers such that a change in pressure on the object causes deformation of one or more of the optical fibers in either the first or second plurality of optical fibers;
- providing a first light source for sending a first light beam through the first plurality of optical fibers and a second light source for sending a second light beam through the second plurality optical fibers;
- measuring any attenuation of the light beam in the first plurality of optical fibers with a first detector and any attenuation of the light beam in the second plurality of optical fibers with a second detector such that the attenuation of light in the one or more deformed optical fibers is measured by at least one of the first detector and the second detector; and
- deriving the weight of the mass located on the object from the attenuation of the light in the one or more deformed optical fibers.

12. The method of claim 11 further comprising deriving the position of the mass on the object from the attenuation of the light in the one or more deformed optical fibers.

13. The method of claim 12 further comprising providing the derived weight and position of the mass on the object to an airbag deployment system.

14. The method of claim 13 wherein the airbag deploys at a certain rate and to a certain extent, and further comprising controlling the rate and extent of deployment of the airbag based at least in part upon the derived weight and position.

15. The method of claim 13 wherein the object is an automobile seat.

16. The method of claim 15 further comprising detecting whether a seatbelt is in use on the automobile seat, and wherein controlling the rate and extent of deployment of the airbag is based at least in part upon whether the seatbelt is in use.

17. The method of claim 15 further comprising providing the derived weight and position of the mass on the automobile seat to a front airbag deployment mechanism.

18. The method of claim 15 further comprising providing the derived weight and position of the mass on the automobile seat to a side airbag deployment mechanism.

19. The method of claim 13 further comprising establishing thresholds for the airbag deployment system at which the airbag will deploy based at least in part upon the derived weight and position.

20. The method of claim 19 wherein the object is an automobile seat.

21. The method of claim 20 further comprising detecting whether a seatbelt is in use on the automobile seat, and wherein establishing thresholds is based at least in part upon whether the seatbelt is in use.

22. The method of claim 21 further comprising detecting the position of the automobile seat relative to the front of the automobile, and wherein establishing thresholds and controlling the rate and extent of deployment of the airbag are each based at least in part upon the detected position of the automobile seat.

23. The method of claim 12 wherein the weight of the mass is derived at a time close to the time when the position of the mass is derived.

24. The method of claim 23 further comprising providing the derived weight and position to an airbag deployment system.

25. The method of claim 23 wherein deriving the weight and position of the mass is completed in less than approximately 1 millisecond.

26. The method of claim 11 further comprising deriving the weight of the mass at a first time and at a second time.

27. The method of claim 26 further comprising deriving the difference in the mass between the first time and the second time.

28. The method of claim 26, wherein the first time is a time in which there is no mass located on the object.

* * * * *